(12) United States Patent
Lee

(10) Patent No.: US 12,505,625 B2
(45) Date of Patent: Dec. 23, 2025

(54) EXTENDED REALITY SERVICE PROVIDING METHOD AND SYSTEM FOR OPERATION OF INDUSTRIAL INSTALLATION

(71) Applicant: Jeong Keun Lee, Seoul (KR)

(72) Inventor: Jeong Keun Lee, Seoul (KR)

(*) Notice: Subject to any disclaimer, the term of this patent is extended or adjusted under 35 U.S.C. 154(b) by 389 days.

(21) Appl. No.: 18/007,177

(22) PCT Filed: Jul. 12, 2021

(86) PCT No.: PCT/KR2021/008883
§ 371 (c)(1),
(2) Date: Apr. 7, 2023

(87) PCT Pub. No.: WO2022/025481
PCT Pub. Date: Feb. 3, 2022

(65) Prior Publication Data
US 2023/0237744 A1    Jul. 27, 2023

(30) Foreign Application Priority Data

Jul. 30, 2020   (KR) .................. 10-2020-0095175
Jan. 20, 2021   (KR) .................. 10-2021-0007791

(51) Int. Cl.
*G06T 19/00*    (2011.01)
*G06F 3/01*    (2006.01)
(Continued)

(52) U.S. Cl.
CPC ............ *G06T 19/006* (2013.01); *G06F 3/017* (2013.01); *G06F 3/04815* (2013.01);
(Continued)

(58) Field of Classification Search
CPC . G06T 19/006; G06T 19/20; G06T 2219/024; G06F 3/017; G06F 3/04815;
(Continued)

(56) References Cited

U.S. PATENT DOCUMENTS 11,496,571 B2 * 11/2022 Berliner ................ H04W 12/08
2020/0329214 A1 * 10/2020 Ahn ........................ G06F 3/017

FOREIGN PATENT DOCUMENTS

JP          2006-133928 A      5/2006
JP          2006133928       *   5/2006
(Continued)

OTHER PUBLICATIONS

International Search Report for PCT/KR2021/008883 dated Nov. 4, 2021 (PCT/ISA/210).

*Primary Examiner* — Cao H Nguyen
(74) *Attorney, Agent, or Firm* — Sughrue Mion, PLLC

(57) ABSTRACT

The present application relates to an extended reality service providing method and system for operation of an industrial installation. More specifically, various types of data required for operation (e.g., inspection, examination, maintenance, repair, and reinforcement) of an industrial installation are digitalized, extended reality content, such as an augmented reality image or a mixed reality image based on the digitalized data, is provided to a site worker or a remote place manager, and the worker and the manager can communicate via a video call in real-time, whereby the work efficiency of the worker and the manager can be enhanced.

10 Claims, 10 Drawing Sheets

(51) Int. Cl.
  *G06F 3/04815*   (2022.01)
  *G06F 3/04817*   (2022.01)
  *G06F 3/0482*    (2013.01)
  *G06Q 10/10*     (2023.01)
  *G06Q 50/04*     (2012.01)
  *G06T 19/20*     (2011.01)
  *G10L 17/02*     (2013.01)
  *G10L 17/22*     (2013.01)

(52) U.S. Cl.
  CPC ........ *G06F 3/04817* (2013.01); *G06F 3/0482* (2013.01); *G06T 19/20* (2013.01); *G10L 17/22* (2013.01); *G06Q 10/10* (2013.01); *G06Q 50/04* (2013.01); *G06T 2219/024* (2013.01); *G06T 2219/2012* (2013.01); *G06T 2219/2016* (2013.01); *G10L 17/02* (2013.01)

(58) Field of Classification Search
  CPC ... G06F 3/04817; G06F 3/0482; G10L 17/22; G06Q 10/10; G06Q 50/04
  See application file for complete search history.

(56) References Cited

FOREIGN PATENT DOCUMENTS

| | | | |
|---|---|---|---|
| JP | 2020-091530 A | | 6/2020 |
| JP | 2020091530 | * | 6/2020 |
| KR | 10-2012-0033188 A | | 4/2012 |
| KR | 10-1990284 B1 | | 6/2019 |
| KR | 10-2086451 B1 | | 5/2020 |
| KR | 102086451 | * | 5/2020 |

* cited by examiner

FIG. 2A

| No. | CLASSIFICATION | | ITEM | OKAY | CAUTION | WARNING |
|---|---|---|---|---|---|---|
| 1 | LUBRICATION SYSTEM | TEST | WHETHER THERE IS LEAKAGE | | | |
| 2 | LUBRICATION SYSTEM | TEST | OPERATING STATE OF OIL HEATER | | | |
| 3 | LUBRICATION SYSTEM | TEST | ENGINE OIL LEVEL | | | |
| 4 | LUBRICATION SYSTEM | EXCHANGE | OIL FILTER | | | |
| 5 | LUBRICATION SYSTEM | EXCHANGE | ENGINE OIL | | | |
| 6 | COOLING SYSTEM | TEST | WHETHER THERE IS LEAKAGE | | | |
| 7 | COOLING SYSTEM | TEST | OPERATING STATE OF COOLING WATER HEATER | | | |
| 8 | COOLING SYSTEM | TEST | HOSE AND PIPELINE STATE | | | |
| 9 | COOLING SYSTEM | TEST | COOLING WATER LEVEL | | | |
| 10 | COOLING SYSTEM | TEST | ANTIFREEZING SOLUTION | | | |
| 11 | COOLING SYSTEM | TEST | BELT STATE AND TENSION | | | |
| 12 | SUCTION SYSTEM | TEST | WHETHER THERE IS LEAKAGE | | | |
| 13 | SUCTION SYSTEM | TEST | PIPELINE AND CONNECTION STATE | | | |
| 14 | FUEL SYSTEM | TEST | WHETHER THERE IS LEAKAGE | | | |
| 15 | FUEL SYSTEM | TEST | FUEL LEVEL | | | |
| 16 | FUEL SYSTEM | TEST | FUEL PIPELINE AND CONNECTION STATE | | | |
| 17 | FUEL SYSTEM | EXCHANGE | EXCHANGE OF FUEL FILTER | | | |
| 18 | EXHAUST SYSTEM | TEST | WHETHER THERE IS LEAKAGE | | | |
| 19 | ELECTRONICS | TEST | BATTERY CHARGING SYSTEM | | | |
| 20 | ELECTRONICS | TEST | LEVEL AND SPECIFIC GRAVITY OF BATTERY ELECTROLYTE | | | |
| 21 | ELECTRONICS | TEST | SAFETY DEVICE AND WARNING | | | |
| 22 | SWITCH GEAR | TEST | ABNORMAL VIBRATIONS | | | |
| 23 | SWITCH GEAR | TEST | OPERATING STATE OF POWER GENERATOR HEATER | | | |
| 24 | ENGINE-RELATED PART | TEST | AUTOMATIC STARTING SWITCH | | | |
| 25 | ENGINE-RELATED PART | TEST | POWER DISTRIBUTION INTERCONNECTION AND CONNECTION STATE | | | |
| 26 | ENGINE-RELATED PART | TEST | POWER CIRCUIT BREAKER | | | |
| 27 | OPERATION PROCEDURE | PERFORM | OPERATING STATE OF ENGINE | | | |
| 28 | OPERATION PROCEDURE | PERFORM | WHETHER VOLTAGE IS GENERATED | | | |
| 29 | OPERATION PROCEDURE | PERFORM | PERFORM FUNCTIONALITY TRANSMISSION STATE | | | |
| NOTES | | | | | | |

EXTENDED REALITY SERVICE PROVIDING METHOD AND SYSTEM FOR OPERATION OF INDUSTRIAL INSTALLATION

CROSS REFERENCE TO RELATED APPLICATIONS

This application is a National Stage of International Application No. PCT/KR2021/008883 filed Jul. 12, 2021, claiming priority based on Korean Patent Application No. 10-2020-0095175 filed Jul. 30, 2020 and Korean Patent Application No. 10-2021-0007791 filed Jan. 20, 2021.

TECHNICAL FIELD

Disclosed are an extended reality (XR) service provision method and system for operating industrial equipment. More specifically, disclosed are an XR service provision method and system for operating industrial equipment with which various types of analog documents required for operation (e.g., test, examination, maintenance, repair, and reinforcement) of industrial equipment are digitalized, XR content, such as an augmented reality (AR) image or a mixed reality (MR) image based on the digitalized data, is provided to a site worker or a remote manager, and the worker and the manager may communicate through a video call in real time so that work efficiency of the worker and the manager can be improved.

BACKGROUND ART

Industrial equipment disposed in various industrial sites is vast in scale, and even when the operation is stopped for only a few minutes, an astronomical amount of money is lost. To reduce such a loss, it is necessary for site workers to frequently carry out visual tests on various types of equipment.

However, in most industrial sites, data (blueprints, drawings, test logs, diagnosis logs, and history information) related to various types of industrial equipment is kept in the form of analog documents. Accordingly, it is not easy for a worker to find desired data.

Also, during an equipment test, a worker has to carry a test log having an analog form and manually write test results on the test log, which degrades work efficiency. In addition, when a problem is found in the equipment test, it is not easy to immediately solve the problem at the site, and it takes considerable time to receive a manager's confirmation.

DISCLOSURE

Technical Problem

The present invention is directed to providing an extended reality (XR) service provision method and system for operating industrial equipment with which various types of data required for operation (e.g., test, examination, maintenance, repair, and reinforcement) of industrial equipment are digitalized, XR content, such as an augmented reality image or a mixed reality (MR) image based on the digitalized data, is provided to a site worker or a remote manager, and the worker and the manager may communicate through a video call in real time so that the work efficiency of the worker and the manager can be improved.

Technical Solution

One aspect of the present invention provides an extended reality (XR) service provision method for operating industrial equipment with which a mixed reality (MR) image or an augmented reality (AR) image is provided to a worker terminal or a manager terminal using a service server connecting a video call between the worker terminal of a worker present at an industrial site and the manager terminal of a manager present at a remote place, the XR service provision method including: imaging, by the worker terminal, a first marker disposed on equipment and acquiring identification information of the equipment on the basis of the first marker; searching for, by the service server, a test algorithm corresponding to the identification information and transmitting the test algorithm to the worker terminal; executing, by the worker terminal, the test algorithm to load a digital test log included in the test algorithm, sequentially activating all test items included in the digital test log in a test order to receive test results of the activated test items from the worker, and separately storing text information and image information received as the test results; and when the test algorithm ends, automatically generating a test report on the basis of the text information and the image information. On a screen of the worker terminal, at least one of a location icon showing a current location of the worker in the industrial site on a map, location name information including a name of the location of the worker in the industrial site, date information, time information, a work progress icon showing test progress according to the test algorithm, an icon for loading menu icons, and a plurality of test state icons may be displayed.

The digital test log may include a basic information input window to which basic information related to the digital test log is input and test result input windows to which the test results are input according to all the test items and which are disposed in the test order.

The test result input windows may include a display box for displaying the test order, a display box for displaying types of superordinate attached equipment of the equipment in relation to the test items, a display box for displaying types of subordinate attached equipment of the equipment in relation to the test items, a display box for displaying test content to be tested by the worker in relation to the test items, a plurality of checkboxes for inputting state information of the test items, and an input box for inputting an additional message in relation to the state information. The plurality of checkboxes may be provided in different colors according to the state information.

When a test for all the test items included in the test log is completed, the plurality of checkboxes may be deactivated so that the state information is not changed, a checkbox selected by the worker from among the plurality of checkboxes may be kept in an existing color, and the remaining checkboxes may be changed to a specific color all together.

The test information and the image information may have the same file name and may be stored along the same storage path, and the file name may include at least one of a test date, identification information of the digital test log, identification information of the test items included in the digital test log, and identification information of detailed items belonging to the test items.

At least one of the location icon, the work progress icon, a cube icon, and the plurality of test state icons may be selected on the basis of a gesture command acquired as a result of recognizing a gesture of the worker or a voice command acquired as a result of recognizing voice of the worker.

The plurality of test state icons may be provided in different colors according to state information that may be input as the test results of the activated test items.

Another aspect of the present invention provides an XR service provision method for operating industrial equipment with which an MR image or an AR image is provided to a worker terminal or a manager terminal using a service server connecting a video call between the worker terminal of a worker present at an industrial site and the manager terminal of a manager present at a remote place, the XR service provision method including: imaging, by the worker terminal, a first marker disposed on equipment and acquiring identification information of the equipment on the basis of the first marker; searching for, by the service server, a test algorithm corresponding to the identification information and transmitting the test algorithm to the worker terminal; searching for, by the service server, three-dimensional (3D) modeling information of equipment corresponding to the identification information and transmitting found 3D modeling information to the manager terminal; acquiring, by the manager terminal, a real-world image including a second marker and processing the acquired real-world image and the 3D modeling information to generate an AR image in which a 3D virtual object corresponding to the equipment is disposed in a specific area of the real-world image; when one menu icon is selected from menu icons displayed together with the AR image, configuring and displaying a screen corresponding to the selected menu icon; when the manager checks the displayed screen and determines information to be transmitted to the worker, transmitting the determined information to the worker terminal through voice or an image; executing, by the worker terminal, the test algorithm to load a digital test log included in the test algorithm, outputting the digital test log and the determined information, sequentially activating all test items included in the digital test log in a test order to receive test results of the activated test items from the worker, and separately storing text information and image information received as the test results; and when the test algorithm ends, automatically generating a test report on the basis of the text information and the image information.

The configuring and displaying of the screen corresponding to the selected menu icon may include at least one of: when a test log icon is selected, displaying a test log list of the equipment; when an angular adjustment icon is selected, rotating the 3D virtual object which is currently displayed; when a fixing icon is selected, fixing a location of the currently displayed 3D virtual object; when an enlargement command or a shrinkage command is input, enlarging or shrinking the currently displayed 3D virtual object; when a file-opening icon is selected, displaying a list of various digital documents related to the equipment; and when a change icon is selected, changing the type of currently displayed 3D virtual object.

Advantageous Effects

When identification information of equipment is recognized through a worker terminal, a test algorithm for the recognized equipment is automatically loaded and executed. Accordingly, a worker need not carry any document printed on paper and can efficiently carry out a test.

Since a worker can input a test result through a gesture or voice in each test stage with the execution of a test algorithm, it is possible to perform a test operation rapidly and accurately.

A video call is made between a worker terminal at a site and a manager terminal at a remote place. Therefore, when a problem is detected in a process in which a worker tests equipment, the worker can discuss with the manager at the remote place in real time to solve the problem, and the manager can rapidly transmit his or her decision related to equipment operation to the worker.

An augmented reality (AR) image in which a three-dimensional (3D) virtual object corresponding to equipment is combined with a real-world image which is captured by a manager terminal is displayed in the manager terminal, and a manager can check the equipment by adjusting the placement or location of the displayed 3D virtual object. Accordingly, the manager can give the worker a more accurate instruction for the equipment.

DESCRIPTION OF DRAWINGS

FIG. 2A is a table illustrating a test log having an analog form.

MODES OF THE INVENTION

Figure 1:
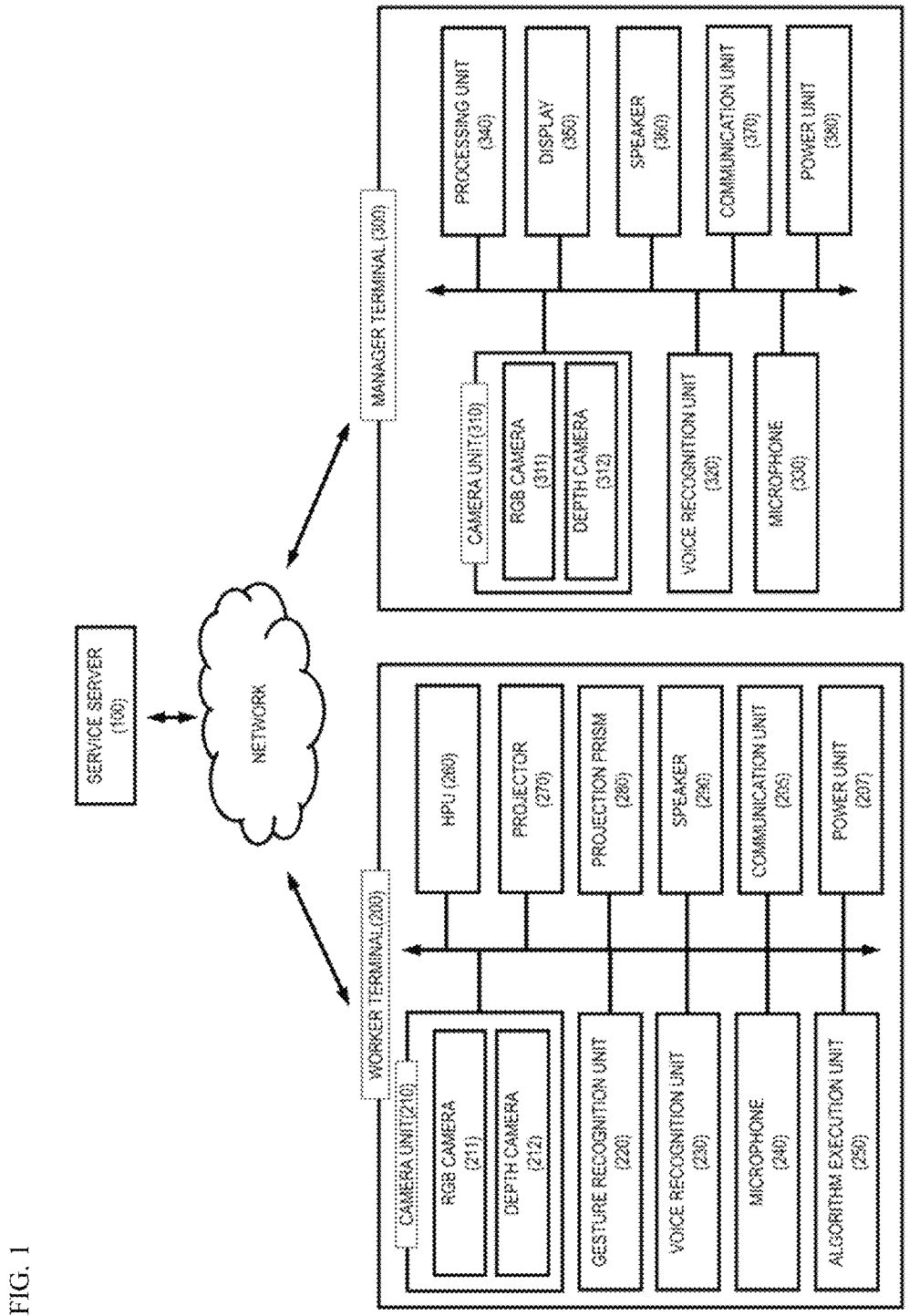
FIG. 1 is a diagram illustrating an extended reality (XR) service provision system for operating industrial equipment according to an embodiment of the present invention.

Advantages and features of the present invention and methods of achieving the same will become apparent with reference to embodiments described in detail below in conjunction with the accompanying drawings. However, the present invention is not limited to the embodiments disclosed below and may be implemented in a variety of different forms. The embodiments are provided only to make the disclosure of the present invention complete and to fully convey the scope of the present invention to those of ordinary skill in the art to which the present invention pertains. The present invention is defined only by the scope of the claims.

Unless otherwise defined, all terms (including technical and scientific terms) used herein have the same meaning as commonly understood by those of ordinary skill in the art to which the present invention pertains. Also, terms defined in commonly used dictionaries are not interpreted ideally or excessively unless expressly so defined herein.

Terminology used herein is for the purpose of describing the embodiments and is not intended to limit the present invention. As used herein, the singular forms include the plural forms as well unless the context clearly indicates otherwise. The terms "comprises" and/or "comprising" used herein do not preclude the presence or addition of one or more components other than stated components.

In the specification, extended reality (XR) may be understood as a concept encompassing virtual reality (VR), augmented reality (AR), and mixed reality (MR).

VR is a technology for displaying an artificial virtual world which is totally different from the real world to a user whose field of vision is blocked.

AR is a technology for displaying virtual content in combination with the real world which is imaged through a camera. In this case, a user may interact with the virtual content by performing an action on the virtual content.

MR is a mix of VR elements and AR elements and is a technology in which interaction with a user is enhanced compared to that in AR.

Hereinafter, embodiments of the present invention will be described with reference to the accompanying drawings. Throughout the drawings, like reference numerals refer to like components.

FIG. 1 is a diagram illustrating an XR service provision system for operating industrial equipment (hereinafter, a "system") according to an embodiment of the present invention. Referring to FIG. 1, the system includes a service server 100, a worker terminal 200 used by a worker who is present at an industrial equipment site, and a manager terminal 300 used by a manager who is present at a remote place.

The service server 100 provides an XR service for operating industrial equipment to the worker terminal 200 and the manager terminal 300.

For example, the service server 100 searches for a test algorithm to be applied to the worker terminal 200 and provides the test algorithm to the worker terminal 200. The test algorithm includes a digitalized test log. When the test algorithm is executed in the worker terminal 200, test items included in the test log are sequentially activated in a test order. The worker may input a test result for each test item by interacting with the worker terminal 200. Also, when the test algorithm ends, a test log is automatically generated. The generated test log may be transmitted to the service server 100 and shared with the manager terminal 300.

As another example, the service server 100 connects a video call between the worker terminal 200 and the manager terminal 300. As a result, voice of the worker or an image displayed through the worker terminal 200 may be shared with the manager, and voice of the manager or an image acquired by the manager terminal 300 may be shared with the worker.

As still another example, the service server 100 stores three-dimensional (3D) modeling information of equipment. The 3D modeling information includes at least one of low-level data, mesh data, point cloud data, and normal vector data.

Low-level data is data obtained by performing 3D scanning on the equipment at various angles using a 3D scanner (not shown). Low-level data may be understood as point cloud data including noise. Mesh data is data obtained by connecting points of point cloud data by triangles which are the smallest face units. Point cloud data is data obtained by performing downsampling on low-level data (point cloud data including noise) acquired through 3D scanning. Normal vector data is normal data calculated for each point of point cloud data.

The 3D modeling information of the equipment is provided to the manager terminal 300 in response to the manager's request. The 3D modeling information provided to the manager terminal 300 may include all the types of data illustrated above or only a type of data selected from among the illustrated types of data. The manager terminal 300 processes the 3D modeling information received from the service server 100, thereby generating an AR image in which a 3D virtual object corresponding to the equipment is combined with a real world image. Subsequently, the manager may check a desired portion by manipulating the 3D virtual object displayed in the manager terminal 300 and transmit checked content to the worker.

As another example, the service server 100 stores digital forms of documents corresponding to various analog forms of documents (a manual, a guide, a blueprint, a cross-section, a test log, a diagnosis log, and a history) related to the equipment. The stored digital forms of documents are transmitted to the worker terminal 200 or the manager terminal 300 in response to a request from the worker or the manager. Analog forms of documents and digital forms of documents will be described below with reference to FIG. 2.

Each of the worker terminal 200 and the manager terminal 300 may include a terminal device. The terminal device may be an information and communication technology (ICT) device. The ICT device is a medium that connects a physical space and an information space and includes interactions among a user, information, and objects and a terminal and parts that make it possible to provide various applications and services on the basis of the interactions.

The ICT device may include a digital device that performs computing operations and a wired and wireless communication device. The digital device may be exemplified by a personal computer (PC). The communication device may be exemplified by a cellular phone, a personal communication service (PCS) phone, a synchronous/asynchronous International Mobile Telecommunication (IMT)-2000 mobile terminal, a palm PC, a personal digital assistant (PDA), a smartphone, a tablet PC, a wireless application protocol (WAP) phone, or a mobile game console. The illustrated digital device and communication device may be a wearable device that can be put on the user's body.

The worker terminal 200 may be a head mounted display (HMD) having an XR function. The HMD is exemplified by HoloLens 1 and HoloLens 2 of Microsoft, Oculus Rift of Oculus, R8 and R9 of Osterhout design group (ODG), etc.

The worker terminal 200 includes a camera unit 210, a gesture recognition unit 220, a voice recognition unit 230, a microphone 240, an algorithm execution unit 250, a holographic processing unit (HPU) 260, a projector 270, a projection prism 280, a speaker 290, a communication unit 205, and a power unit 207.

The camera unit 210 acquires an image by imaging the real world. The camera unit includes a red green blue (RGB) camera 211 for acquiring an RGB image and a depth camera 212 for acquiring a depth image.

The gesture recognition unit 220 recognizes a gesture of the worker, for example, a position and movement of the worker's hand or fingers, and outputs a gesture command as the result.

The voice recognition unit 230 recognizes voice of the worker and outputs a voice command as the result. For example, when the worker says the word "snap," a corresponding sound signal is input to the microphone 240, and the microphone 240 outputs a corresponding audio signal. The voice recognition unit 230 extracts a feature vector from the audio signal. Subsequently, the voice recognition unit 230 calculates similarities between the extracted feature vector and previously stored feature vectors and outputs a voice command corresponding to a feature vector having a similarity of a reference value or more among the previously stored feature vectors.

To improve accuracy in voice recognition, the voice recognition unit 230 may be trained in advance. For example, people having different voice levels, intonations, and speech patterns are sequentially asked to read a word or a sentence, and corresponding sound signals are sequentially input to the microphone 240. Then, feature vectors are sequentially extracted from output audio signals. When an extracted feature vector has a similarity of the reference value or more with an ideal feature vector, a positive (+) reward is applied to the voice recognition unit. Otherwise, a negative (−) reward is applied to the voice recognition unit.

When a first marker (e.g., a quick response (QR) code attached to the equipment) is imaged by the camera unit 210, the algorithm execution unit 250 acquires identification information of the equipment by recognizing the first marker in the captured image. Then, the algorithm execution unit 250 loads a visual test algorithm for the equipment on the basis of the acquired identification information. After that, the loaded test algorithm is executed. Specifically, the algorithm execution unit sequentially activates test items in a predetermined order. Subsequently, when a gesture or voice of the worker is recognized by the gesture recognition unit or the voice recognition unit and a gesture command or a voice command is input, a test result of a current test item is stored on the basis of the input command.

Although not shown in the drawing, the HPU 260 processes information input from various sensors, for example, a motion tracking sensor, a time-of-flight (ToF) sensor, inertial measurement equipment, an infrared sensor, etc., provided in the worker terminal 200. Also, the HPU 260 processes a gesture command or a voice command input from the gesture recognition unit or the voice recognition unit 230. As a result, the HPU 260 generates an MR image by projecting a virtual object on an image of the real world.

The projector 270 outputs the MR image generated by the HPU 260.

The communication unit 205 communicates with the service server 100 and the manager terminal 300.

The power unit 207 supplies power to each of the components. The power unit 207 includes a battery, which may be charged with power provided from an external power supply device (not shown).

Meanwhile, the manager terminal 300 may be exemplified by a smartphone of a tablet PC. The manager terminal 300 includes a camera unit 310, a voice recognition unit 320, a microphone 330, a processing unit 340, a display 350, a speaker 360, a communication unit 370, and a power unit 380. Among the components, description of components that are similar to or the same as those of the worker terminal 200 described above will be omitted.

Although not shown in the drawing, the processing unit 340 processes information input from various sensors provided in the manager terminal 300. Also, the processing unit 340 processes the 3D modeling information received from the service server 100. As a result, the processing unit 340 generates the AR image in which the 3D virtual object corresponding to the equipment is combined with the image obtained by imaging the real world. The generated AR image is displayed through the display 350.

The display 350 may be implemented as a touchscreen having both a display function and an input function. The display 350 displays at least one of the image generated by the manager terminal 300 and the image generated by the worker terminal 200. For example, during a video call with the worker terminal 200, the image received from the worker terminal 200 is displayed on the display 350 without any change. In this case, when the manager inputs a command to load the 3D modeling information of the equipment, the AR image in which the 3D virtual object corresponding to the equipment is combined with the image obtained by imaging the real world is displayed in a partial area of the display 350, and the image received from the worker terminal 200 is displayed in the remaining area.

Figure 2B:
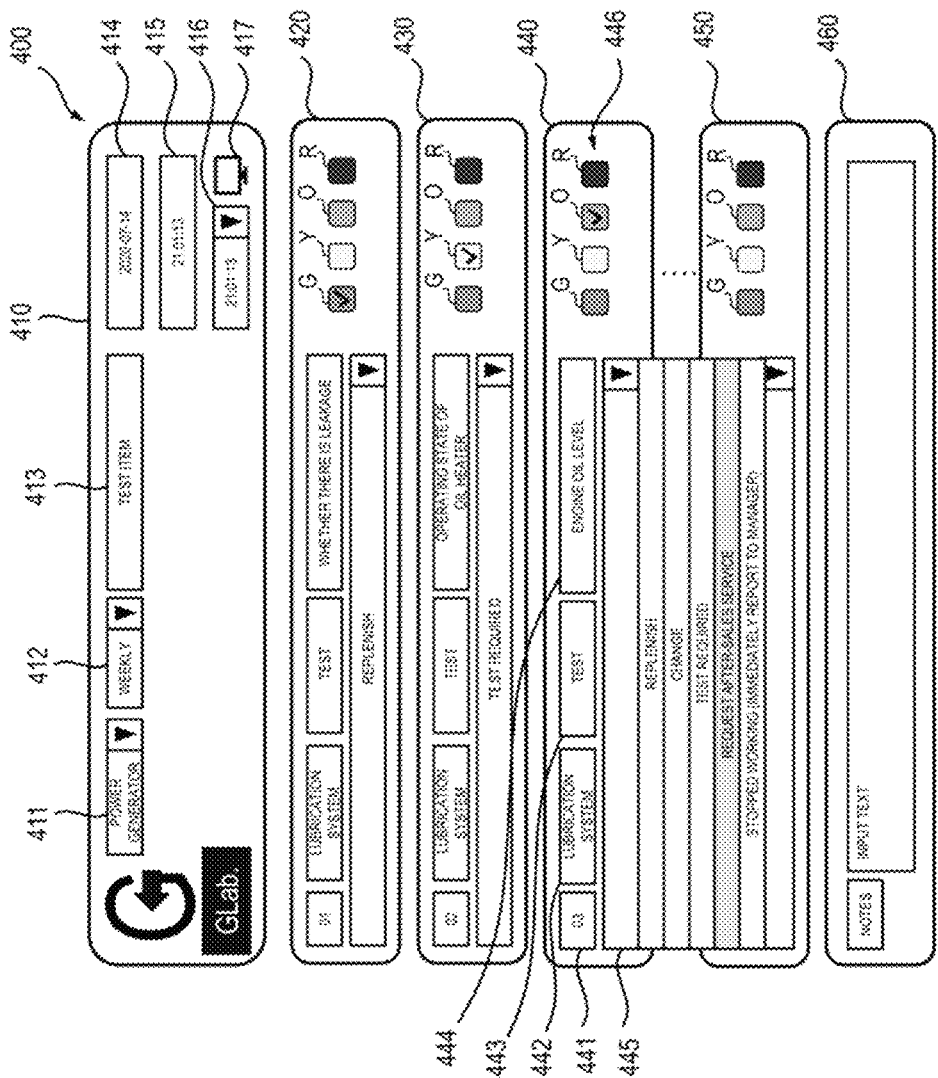
FIG. 2B is a diagram illustrating a test log having a digital form.
Figure 2C:
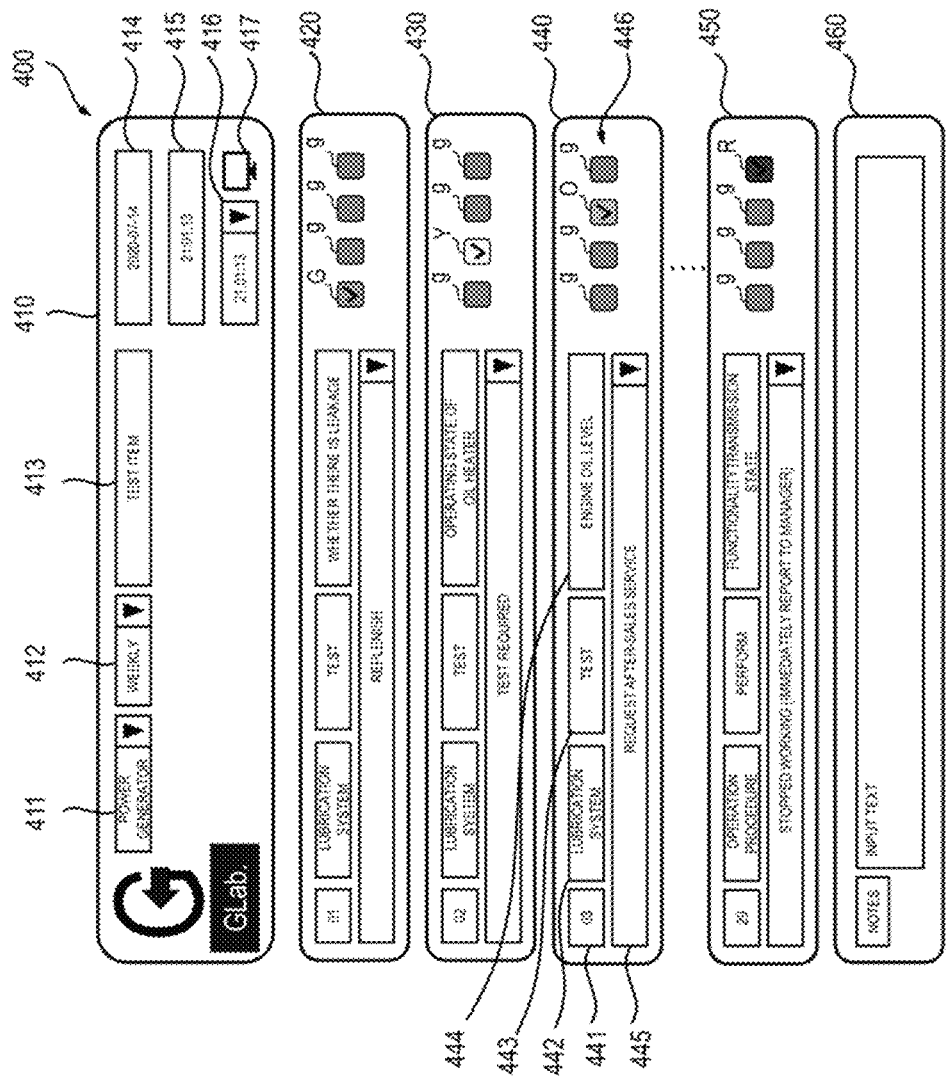
FIG. 2C is a diagram illustrating a changed state of the test log having the digital form.

Next, an analog form of a document and a digital form of a document will be described with reference to FIGS. 2A, 2B, and 2C. FIG. 2A is a table illustrating a test log having an analog form. FIG. 2B is a diagram illustrating a test log having a digital form. FIG. 2C is a diagram illustrating a changed state of the test log having the digital form.

Since the test log in analog form shown in FIG. 2A is printed on paper, it is inconvenient to keep and carry the test log in analog form. Also, it is not easy for a worker to find desired content. On the other hand, it is easy to keep and carry a test log in digital form, and a worker can easily search for desired content.

According to an embodiment, the test log in digital form shown in FIG. 2B is generated on the basis of the test log in analog form. Specifically, the test log in digital form includes information included in the test log in analog form, and the information is disposed so that a worker or a manager can intuitively understand the information.

Referring to FIG. 2B, a digital test log 400 includes a basic information input window 410, test result input windows 420, 430, 440, and 450, and a note input window 460.

The basic information input window 410 is disposed at the upper end of the screen. In the basic information input window 410, input boxes for inputting basic information related to a digital test log are disposed. For example, an input box 411 for inputting a type of equipment (a power generator, a transformer, or an electric motor), an input box 412 for inputting a type of test log (daily, weekly, monthly, or yearly), an input box 413 for inputting a test item, an input box 414 for inputting a test date, an input box 415 for inputting a test time, an input box 416 for inputting a tester name, and a save icon 417 for storing currently input content and showing the screen are disposed. Here, a dropdown button is disposed in the input box 411 for inputting a type of equipment, the input box 412 for inputting a type of test log, and the input box 416 for inputting a tester name.

The test result input windows 420, 430, 440, 450, and 460 for inputting test results according to subordinate attached equipment are disposed in a test order under the basic information input window 410. In the test result input window 440, a display box 441 for displaying the test order, a display box 442 for displaying a type of superordinate attached equipment, a display box 443 for displaying a type of subordinate attached equipment, a display box 444 for displaying test point (a point to be tested by a worker), checkboxes 446 for inputting state information (okay, caution, warning, or danger) of test items (the superordinate attached equipment and the subordinate attached equipment), an input box 445 for inputting an additional message in relation to the state information, etc. are disposed.

Here, a dropdown button is disposed in the input box 445. When the dropdown button is selected, a selectable message list is displayed. The message list may include, for example, replenishment, exchange, test, request, after-sales service request, operation suspension (immediately reported to the manager), etc.

Also, the checkboxes 446 may be implemented in different colors according to state information that can be input.

For example, it is assumed that the four checkboxes 446 may be horizontally disposed in one line, and state information corresponding to okay, caution, warning, and danger may be sequentially input to the checkboxes 446 beginning with the leftmost one. In this case, from the left, the checkboxes 446 may be displayed in green G, yellow Y, orange O, and red R. In this way, when the checkboxes 446 are displayed in different colors, the worker can select state information of each test item without a mistake.

Also, when the test for all the test items included in the test log is completed, the checkboxes 446 may be deactivated so that state information cannot be changed. As shown in FIG. 2B, checkboxes selected by the worker may be kept in the existing colors G, Y, O, and R, and checkboxes which are not selected may be changed to gray g. When only colors of checkboxes selected by the worker are kept as the existing colors, the worker or the manager can intuitively understand state information of each test item in the case of checking the test log.

The note input window 460 is disposed under the test result input window 450 corresponding to the last test sequence.

Meanwhile, when the worker terminal 200 recognizes the first marker provided in the equipment and acquires the identification information of the equipment, a test algorithm corresponding to the acquired identification information is automatically loaded from the service server 100 to the worker terminal 200. The loaded test algorithm includes a digitalized test log as described above. When the loaded test algorithm is executed, the basic information input window 410 of the digitalized test log is highlighted or activated first. After that, the test result input windows 420, 430, and 440 are sequentially highlighted or activated.

Also, all input boxes or checkboxes 446 disposed in the activated test result input window 440 are displayed in an activated state and sequentially highlighted. In this case, the worker inputs test results to the input box 445 or selects one of the checkboxes 446 in the order in which they were highlighted. As another example, the input box 445 or the checkboxes 446 may be sequentially activated. In this case, the worker inputs test results to the input box 445 or select one of the checkboxes 446 in the order in which they were activated.

According to the embodiment, when the test algorithm is executed, a digitalized test log may be displayed on the screen. In this case, the worker may input a test result by touching a highlighted or activated input box with his or her hand or touching one of highlighted or activated checkboxes with his or her hand. Alternatively, the worker may input a test result by saying a word or sentence corresponding to the test result.

According to another embodiment, when the test algorithm is executed, the digitalized test log may not be displayed on the screen. In this case, the test items included in the test log may be provided through voice in sequence, and the worker may carry out a test for the test items provided through voice and input the test results through voice.

Meanwhile, with regard to each test item, information input through the input box 445 or the checkboxes 446 disposed in the test result input window 440 is classified and stored as text information. According to the embodiment, the worker may capture the screen in relation to each test item, and the captured screen is classified and stored as image information. Here, the text information and the image information are stored along the same storage path. Also, the text information and the image information have different file formats but the same filename. For example, the filename may be designated to include at least one of date information, identification information of the test log, and identification information of the test items.

Specifically, the text information may be stored in the text file format "20200715_1111_001_01.txt," and the image information may be stored in the image file format "20200715_1111_001_01.jpg." In each filename, "20200715" represents a date (Jul. 15, 2020) on which the test was performed, "1111" represents identification information of the digitalized test log, and "001" represents identification information of a test item. "01" represents identification information of a detailed item (state information 446 and an additional message 445 related to the state information in FIG. 2B).

As described above, when a test is performed according to a test algorithm including a digitalized test log, it is possible to improve work efficiency of a worker, and the worker can also intuitively understand the test results.

Figure 3:
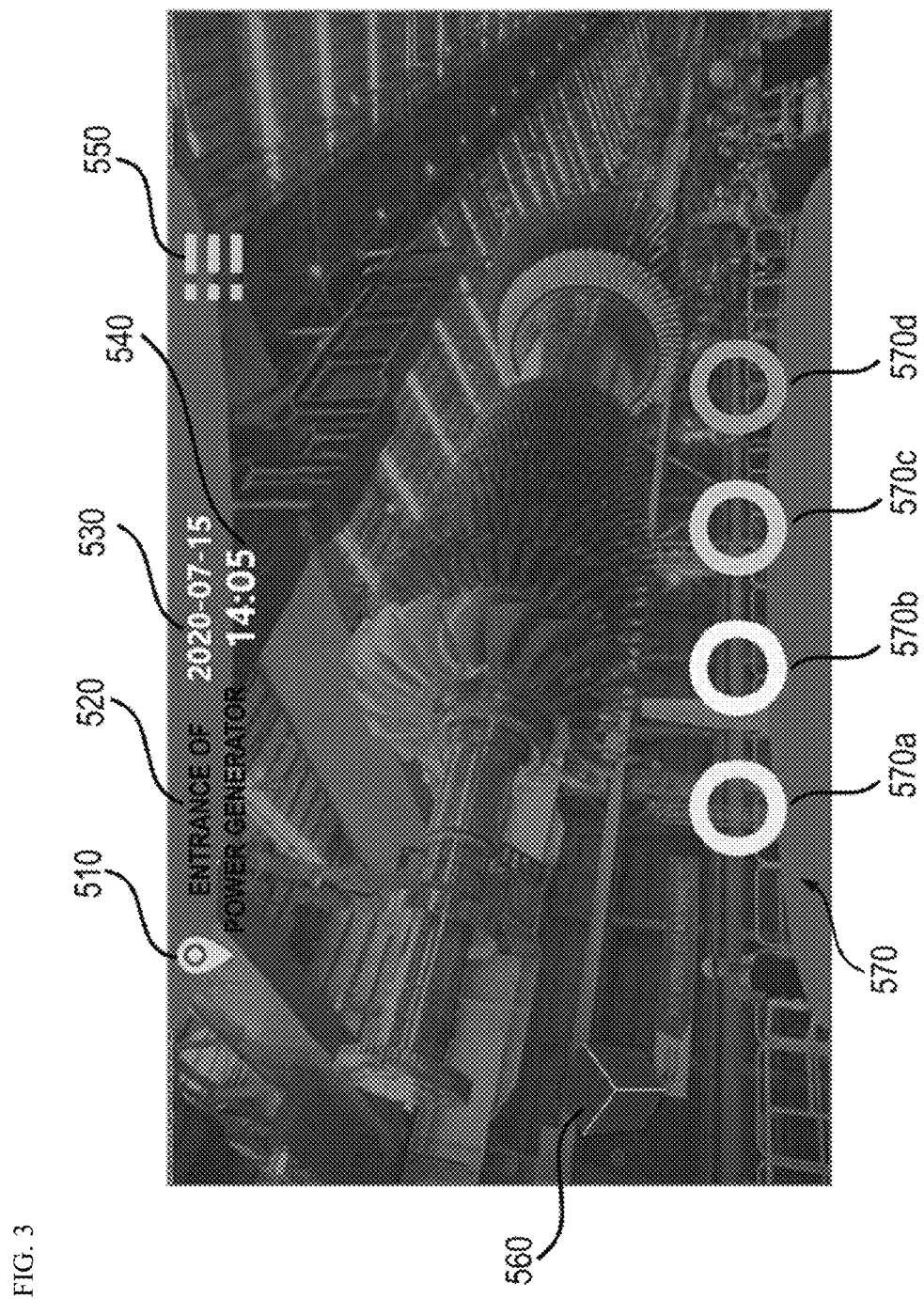
FIG. 3 illustrates a screen displayed through a worker terminal.

FIG. 3 illustrates a screen displayed through the worker terminal 200. The screen of FIG. 3 may be an MR image in which various information or icons are combined with a real-world image.

Referring to FIG. 3, a location icon 510, location name information 520, date information 530, time information 540, and a work progress icon 550 are disposed at the upper end of the screen. A cube icon 560 and a test state icon 570 are disposed at the lower end of the screen.

The location icon 510 has a function of displaying current location information of the worker on a map. The location icon 510 is selected by a gesture or voice of the worker. When the location icon 510 is selected, a two-dimensional (2D) map or a 3D map on which the current location of the worker is shown is displayed. When the worker moves while the 3D map is displayed, an icon representing the location of the worker is also moved in real time.

The location name information 520 represents a name of a location of the worker in an industrial site and is displayed as text on one side of the location icon 510. The location name information 520 is changed in real time with a change in the location of the worker. For example, when the worker moves from a power generator entrance toward a power generator exit, the location name information 520 is changed from "power generator entrance" to "power generator exit." The location name information 520 may be provided on the basis of a blueprint of the industrial site and Global Positioning System (GPS) information of the worker terminal 200.

The date information 530 is represented by at least one of numbers and letters. FIG. 3 shows a case in which the date information 530 is only represented by numbers. In addition, an order of displaying the date information 530 (year-month-day, day-month-year, or month-day-year) and a language, size, etc. for displaying the date information 530 may be changed by the worker.

The time information 540 is represented by at least one of numbers, letters, and special characters. FIG. 3 shows a case in which the time information 540 is represented by numbers and a special character.

The work progress icon 550 has a function of displaying work progress. For example, the worker is assumed to select the work progress icon 550 while testing the equipment. In this case, test steps which have been completed so far versus all test steps are visualized and displayed in a graph. As another example, among all the test items included in the test log, a test item that is currently tested by the worker is displayed with highlighting to differentiate it from other test items. As still another example, among all the test items included in the test log, test items for which a test has already been completed are displayed with highlighting to differentiate them from test items for which a test has not been completed.

The cube icon 560 has a function of loading menu icons 561, 562, 563, and 564 to be described below. The cube icon 560 is selected by a gesture or voice of the worker. For example, when the worker clicks the cube icon 560 with his or her hand, the cube icon 560 is selected. As another example, when the worker says "tap," the cube icon 560 is selected. When the cube icon 560 is selected, the menu icons 561, 562, 563, and 564 are displayed. The menu icons 561, 562, 563, and 564 will be described below with reference to FIG. 4.

The test state icon 570 has a function of inputting state information of test items. For example, the state information may be classified into okay, caution, warning, and danger. Accordingly, the test state icon 570 may be implemented to include four circular icons 570a, 570b, 570c, and 570d having different colors on the basis of state information. FIG. 3 shows a case in which the test state icon 570 includes the green icon 570a, the yellow icon 570b, the orange icon 570c, and the red icon 570d.

The worker may use a measuring device when testing the equipment. When a value measured through the measuring device in relation to a specific item corresponds to a first range (81% to 100%) of normal values, the item is determined to be in the "okay" state, and the green icon 570a is selected. When the measured value corresponds to a second range (61% to 80%) of normal values, the item is determined to be in the "caution" state, and the yellow icon 570b is selected. When the measured value corresponds to a third range (41% to 60%) of normal values, the item is determined to be in the "warning" state, and the orange icon 570c is selected. When a measured value corresponds to a fourth range (40% or less) of normal values, the item is determined to be in the "danger" state, and the red icon 570d is selected.

The test state icon 570 is selected by a gesture or voice of the worker. For example, when the worker clicks the green icon 570a with his or her hand or finger on an MR screen, the green icon 570a is selected. As another example, when the worker says the word "green" or "okay," the green icon 570a is selected. Even when the worker says a sentence including the word, the green icon 570a is selected. For example, when the worker says "select the green icon," "select green," or "it's okay," the green icon is selected. Likewise, when the worker says the word "yellow" or "caution" or a sentence including the word, the yellow icon 570b is selected. When the worker says the word "orange" or "caution" or a sentence including the word, the orange icon 570c is selected. When the worker says the word "red" or "danger" or a sentence including the word, the red icon 570d is selected.

In the above description, four types of words have been exemplified as voice commands for selecting each of the circular icons 570a, 570b, 570c, and 570d. However, the number and types of voice commands are not necessarily limited thereto. According to another embodiment, the worker may select in advance a voice command to be used among a plurality of voice commands provided by the worker terminal 200. According to still another embodiment, voice commands may be supported in various languages. Accordingly, when the worker selects one or more languages, all words corresponding to the selected languages may be set as voice commands. For example, when the worker selects Korean, English, and Japanese as languages to be used, "적색," "red," and "あかいろ (akairo)" may be set as voice commands, respectively.

Figure 4:
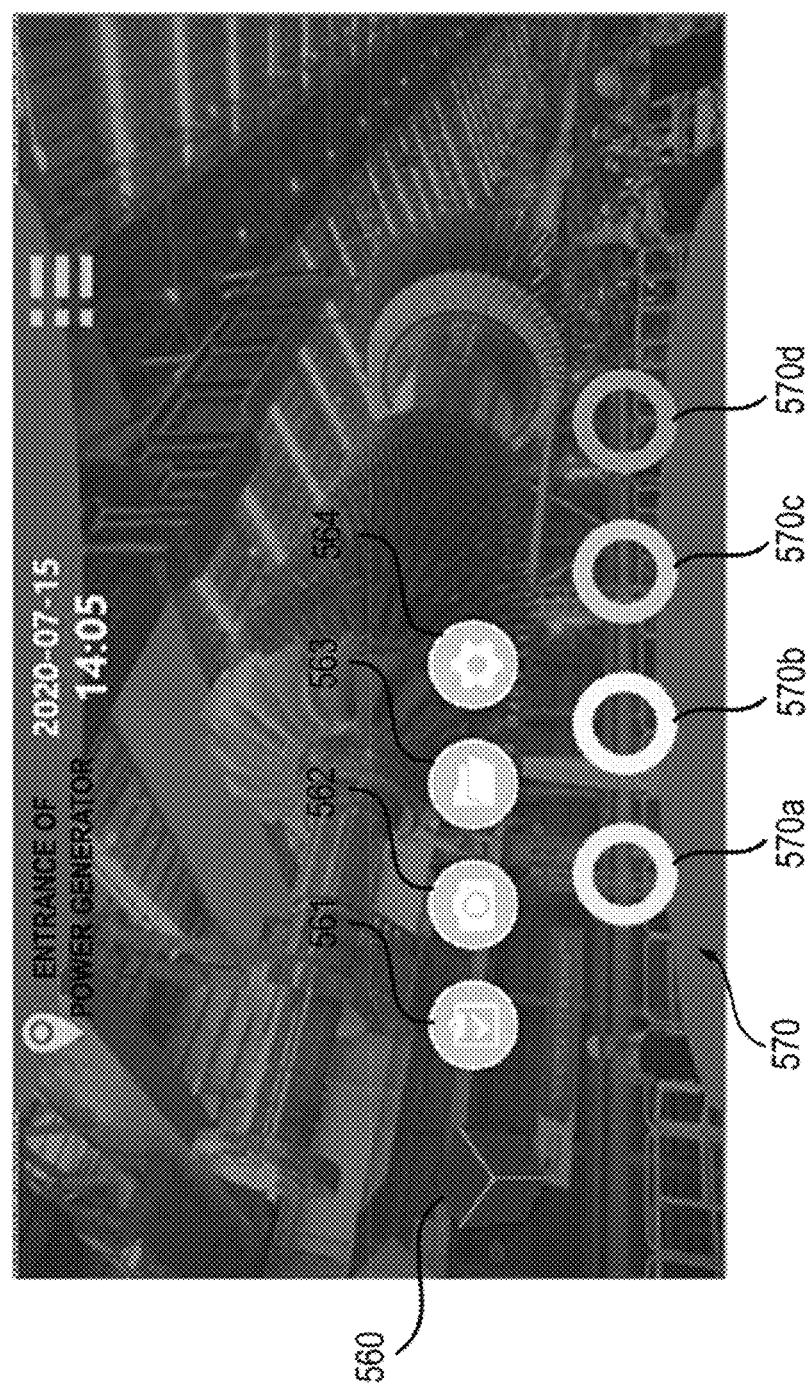
FIG. 4 illustrates a screen on which menu icons are displayed.

FIG. 4 illustrates a screen on which the menu icons 561, 562, 563, and 564 are displayed. Referring to FIG. 4, the menu icons 561, 562, 563, and 564 include the test log and calendar icon 561, the capture icon 562, the search icon 563, and the environment setting icon 564.

The test log and calendar icon 561 has a function of loading a test log or a calendar. Specifically, when the test log and calendar icon 561 is selected, a guidance message for selecting one of the test log and the calendar is output through voice or an image. In this case, when the worker selects the calendar, the calendar is loaded and displayed on the screen. When the worker selects the test log, the test log is loaded and displayed on the screen.

When the test log is loaded, a part or all the test log may be displayed on the screen according to progress of the worker's equipment test. For example, before the worker starts an equipment test, only the basic information input window 410 in the test log shown in FIG. 2B may be displayed on the screen. As a result, the worker may input basic information of the test log. When the worker has completed the equipment test, a test log list stored in advance in the worker terminal 200 is displayed on the screen. When one test log is selected from the displayed test log list, the whole selected test log is displayed on the screen. As a result, the worker can check the entire content of the displayed test log.

The capture icon 562 has a function of capturing the screen that is currently displayed. In addition, the capture icon 562 may have a function of recording the currently displayed screen as a video. Which one of the screen capture function and the video recording function will be used may be set in advance by the worker. For example, the worker may select only one of the two functions. As another example, the worker may select both of the two functions.

The search icon 563 has a function of displaying at least one of a list of captured screens and a list of recorded videos.

The environment setting icon 564 has a function of setting basic environments of use (e.g., the screen, editing, and user information). The worker may select the environment setting icon 564 to set types of menu icons to be displayed on the screen and an order in which the menu icons are disposed. Also, the worker may selectively set a function to be used for a menu icon having a plurality of functions.

The above-described menu icons 561, 562, 563, and 564 are selected by a gesture or voice of the worker. For example, when the worker clicks the capture icon 562 with his or her hand or finger in the MR screen, the capture icon 562 is selected. As another example, when the worker says the word "capture," the capture icon 562 is selected. Even when the worker says a sentence including the word, the capture icon 562 is selected. For example, when the worker says "do a capture" or "screen capture," the capture icon 562 is selected. The search icon 563 is selected when the worker says the word "search" or a sentence including the word. The environment setting icon 564 is selected when the worker says the words "environment setting" or a sentence including the words.

Figure 5:
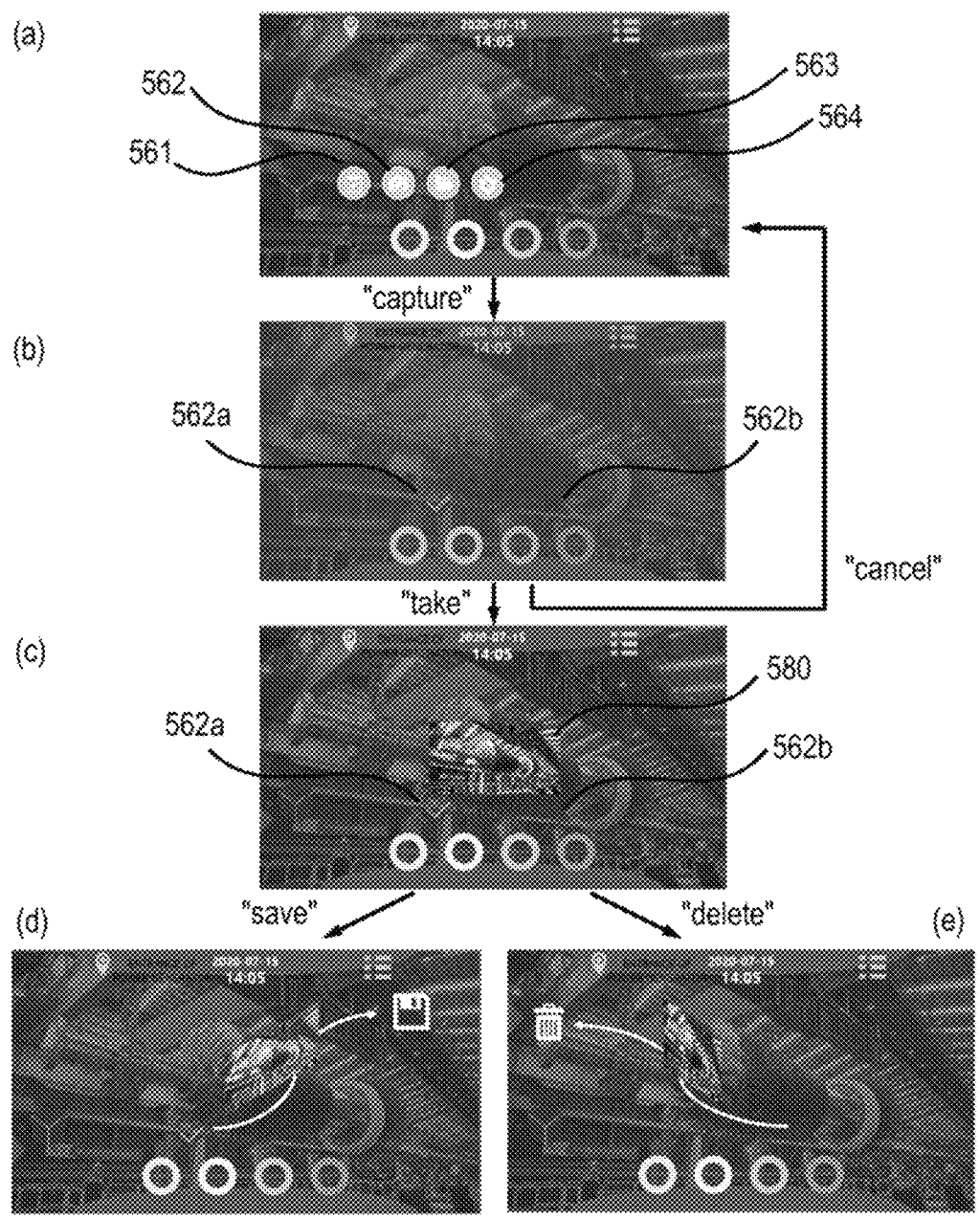
FIG. 5 illustrates a set of screens of voice commands for selecting sub-icons belonging to a capture icon and screens that are displayed as results of executing the voice commands.

FIG. 5 illustrates a set of screens of voice commands for selecting sub-icons 562a and 562b belonging to the capture icon 562 and screens that are displayed as results of executing the voice commands.

As shown in (a) of FIG. 5, when the worker says "capture" while the menu icons 561, 562, 563, and 564 are displayed, the capture icon 562 is selected. As a result, as shown in (b) of FIG. 5, a currently displayed screen is captured and temporarily stored. Also, the save icon 562a for saving the captured screen and the delete icon 562b for deleting the captured screen are additionally displayed.

When the worker says "cancle" while the screen shown in (b) of FIG. 5 is displayed, the capture operation is cancelled. As a result, the screen captured in operation (b) is deleted, and the screen shown in (a) of FIG. 5 is displayed again.

When the worker says "take" while the screen shown in (b) of FIG. 5 is displayed, the screen captured in operation (b) is displayed on the screen as shown in (c) of FIG. 5. In this case, the captured screen is reduced in size and displayed so as not to obstruct the worker's view.

When the worker says "save" while the screen shown in (c) of FIG. 5 is displayed, the save icon 562a is selected. As a result, a screen shown in (d) of FIG. 5 is displayed, and the screen captured in operation (b) is saved.

When the worker says "delete" while the screen shown in (c) of FIG. 5 is displayed, the delete icon 562b is selected. As a result, a screen shown in (e) of FIG. 5 is displayed, and the screen captured in operation (b) is deleted.

Voice commands for selecting the sub-icons 562a and 562b belonging to the capture icon 562 have been described above with reference to FIG. 5. While FIG. 5 illustrates a case in which voice commands for selecting the sub-icons 562a and 562b are English words, such as "capture," "take," "cancle," "save," "delete," etc., these voice commands may be replaced with Korean words. For example, the words "capture," "cancle," "save," "delete," etc. may be replaced with Korean words "pochak," chuiso," jeojang," and sakje," respectively.

Figure 6:
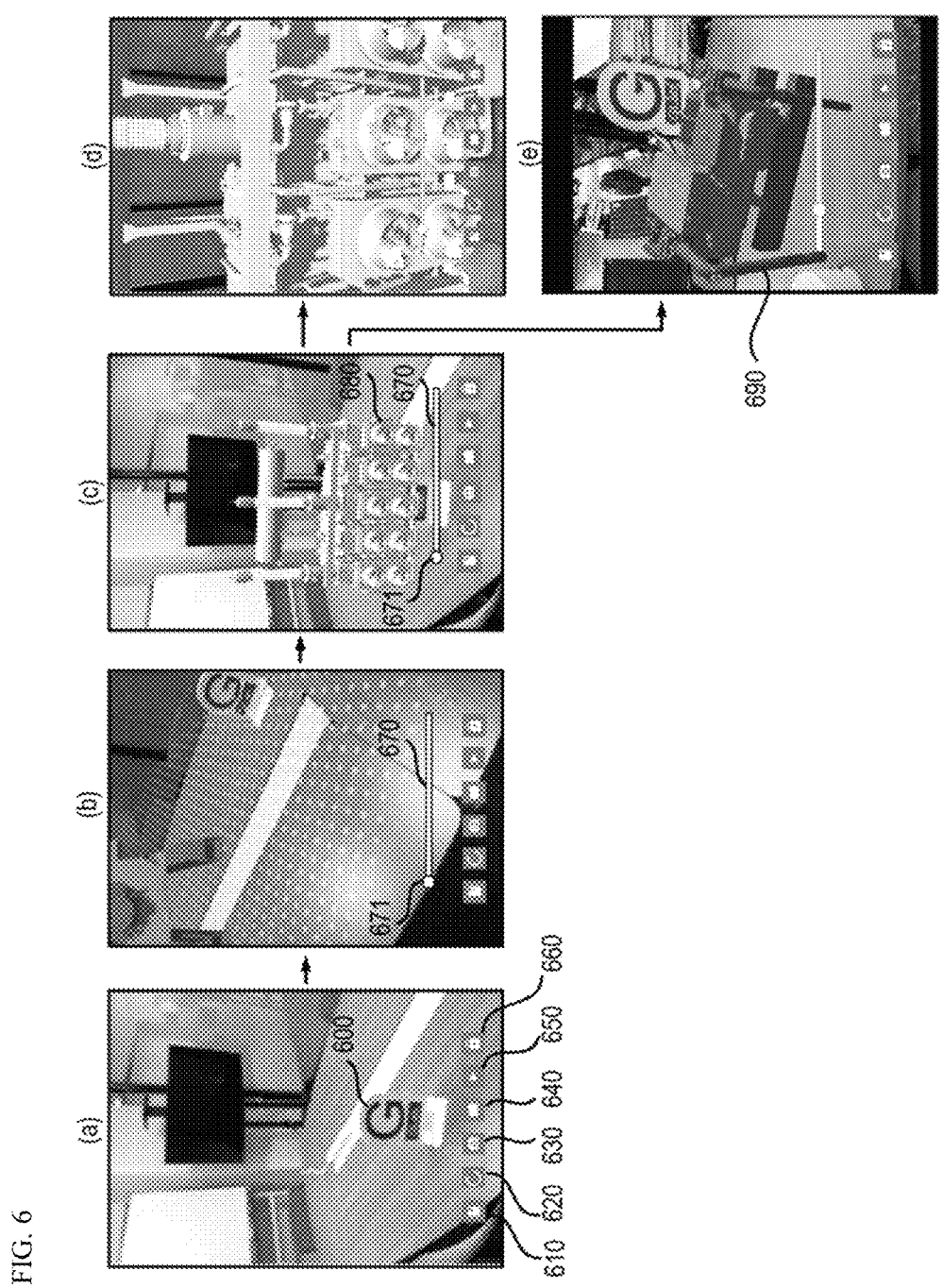
FIG. 6 illustrates a set of screens displayed through a manager terminal.

FIG. 6 illustrates a set of screens displayed through the manager terminal 300.

Referring to (a) of FIG. 6, menu icons 610, 620, 630, 640, 650, and 660 are disposed in the screen. In this case, a real-world image captured through the camera of the manager terminal 300 may be displayed on the screen. The menu icons 610, 620, 630, 640, 650, and 660 include the test log icon 610, the rotation icon 620, the capture icon 630, the file opening icon 640, the change icon 650, and the fixation icon 660.

The test log icon 610 has a function of opening a test log stored in the service server 100 or saving a test log which is currently open. When the test log icon 610 is selected, a file open window (not shown) for loading a test log is displayed. The manager may select a desired test log in the displayed file open window.

The rotation icon 620 has a function of processing 3D modeling information corresponding to equipment identified by the worker terminal 200 and placing a 3D virtual object corresponding to the equipment in a specific area of the real-world image. Also, the rotation icon 620 has a function of rotating the placed 3D virtual object.

The capture icon 630 has a function of capturing a screen which is currently displayed. The captured screen may be transmitted to the service server 100 and shared with the worker terminal 200.

The file opening icon 640 has a function of loading not only a test log but also various types of digital documents related to equipment, for example, a manual, a guide, a blueprint, a cross-section, a history, etc. When the file opening icon 640 is selected, a file open window (not shown) is displayed, and the manager may select a desired digital document in the displayed file open window.

The change icon 650 has a function of changing a type of 3D virtual object included in an AR image. When the change icon 650 is selected, a list of selectable equipment is displayed, and the manager selects desired equipment in the displayed equipment list. Then, the manager terminal 300 requests 3D modeling information corresponding to the selected equipment from the service server 100, and the service server 100 searches for the requested 3D modeling information and transmits the requested 3D modeling information to the manager terminal 300. Subsequently, the manager terminal 300 processes the received 3D modeling information to generate an AR image in which the 3D virtual object corresponding to the selected equipment is combined with a real-world image.

The fixation icon 660 has a function of fixing a location of the 3D virtual object in the AR image which is currently displayed. Therefore, after the fixation icon 660 is selected, the 3D virtual object in the AR image is not rotated even when the rotation icon 620 is selected. The fixation icon 660 may be helpful when used for enlarging a specific portion of the 3D virtual object.

The function of the rotation icon 620 will be described in further detail below.

When the rotation icon 620 is selected from among the menu icons shown in (a) of FIG. 6, a request signal for requesting 3D modeling information of the equipment identified by the worker terminal 200 is transmitted to the service server 100. For example, when the equipment identified by the worker terminal 200 is a transformer, a signal for requesting 3D modeling information of the transformer is transmitted to the service server 100. Subsequently, when the 3D modeling information of the transformer is received from the service server 100, the manager terminal 300 processes the received 3D modeling information to generate an AR image in which a 3D virtual object corresponding to the transformer is combined with a real-world image. A process of generating the AR image will be described in further detail below.

First, the manager terminal 300 acquires a real-world image in which a second marker 600 is disposed as shown in (a) of FIG. 6.

When the second marker 600 is recognized in the acquired real-world image, feature points are extracted from an acquired depth image which is acquired through a depth camera 312, and a plane is recognized on the basis of the extracted feature points. The extracted feature points may be displayed on the screen as shown in (b) of FIG. 6.

When the plane is recognized in the real-world image, an AR image in which a 3D virtual object 680 corresponding to the transformer is disposed on the recognized plane is generated and displayed as shown in (c) of FIG. 6. Also, an angular adjustment icon 670 for adjusting a rotation angle of a 3D virtual object is displayed on the screen. The angular adjustment icon 670 may be implemented in the form of, for example, a stick including an angular adjustment pointer 671. The manager may rotate the 3D virtual object by moving the angular adjustment pointer 671 to the left or right according to the angular adjustment icon 670. According to another embodiment, the angular adjustment icon 670 may not be displayed on the screen. In this case, the manager may rotate the 3D virtual object using a gesture or voice.

Subsequently, the manager may enlarge a specific portion of the 3D virtual object 680 as shown in (d) of FIG. 6 by inputting an enlargement command of voice or multiple gestures. Before inputting the enlargement command of voice or multiple gestures, the manager may select the fixation icon 660 to fix a location of the 3D virtual object.

Meanwhile, the manager who checks the enlarged portion may transmit checked information or an instruction to the worker through voice. Alternatively, the manager may have the corresponding screen captured by selecting the capture icon 630 and provide the captured screen to the worker terminal 200. According to another embodiment, the AR image which is displayed through the manager terminal 300 may be shared with the worker terminal 200 without any change rather than the captured screen. When the captured screen or the AR image is shared with the worker terminal 200, the manager can accurately convey his or her opinion, and the worker can understand an instruction of the manager rapidly and accurately.

When it is necessary to check equipment other than a transformer while remotely supporting a job of the worker, the manager may select the change icon 650 and change a type of 3D virtual object disposed in a real-world image. For example, when it is necessary to check a power generator, the manager causes a list of selectable equipment to be displayed on the screen by selecting the change icon 650 and selects "power generator" in the displayed equipment list. As a result, a request signal for requesting 3D modeling information corresponding to a power generator is transmitted from the manager terminal 300 to the service server 100, and the service server 100 searches for 3D modeling information of a power generator and transmits the 3D modeling information to the manager terminal 300. Subsequently, the manager terminal 300 processes the received 3D modeling information to generate an AR image in which a 3D virtual object 690 corresponding to the power generator is combined with the real-world image. As a result, an AR image like that shown in (e) of FIG. 6 is displayed in the manager terminal 300.

Figure 7:
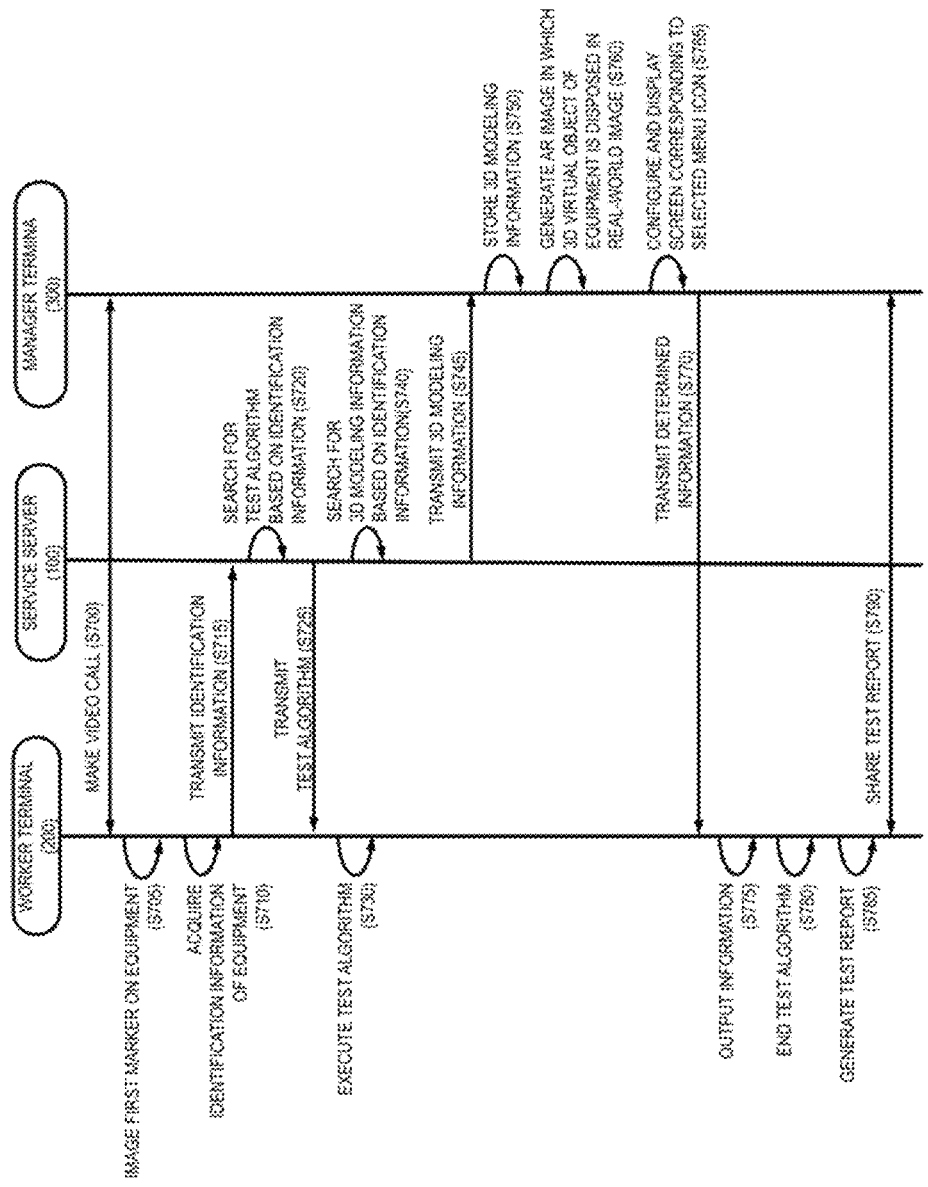
FIG. 7 is a sequence diagram illustrating an XR service provision method for operating industrial equipment according to an embodiment of the present invention.

FIG. 7 is a sequence diagram illustrating an XR service provision method for operating industrial equipment according to an embodiment of the present invention.

Prior to the description, it is assumed that account setting and right setting for a service user, environment setting of the worker terminal 200, environment setting of the manager terminal 300, etc. are completed.

The worker carrying the worker terminal 200 moves to a location of equipment. Subsequently, a video call is made between the worker terminal 200 and the manager terminal 300 in response to a request from the worker terminal 200 (S700). The operation S700 includes an operation in which the worker terminal 200 transmits a request signal for requesting a video call with the manager terminal 300 to the service server 100, an operation in which the service server 100 transmits the video call request signal received from the worker terminal 200 to the manager terminal 300, and an operation in which the service server 100 makes a video call between the worker terminal 200 and the manager terminal 300 when an approval signal for approving the video call is received from the manager terminal 300.

Here, an MR image like that shown in FIG. 3 may be displayed in the worker terminal 200. Also, a real-world image like that shown in (a) of FIG. 6 may be displayed in the manager terminal 300.

Subsequently, the worker terminal 200 images a first marker disposed in the equipment (S705) and recognizes the first marker in the captured image to acquire identification information of the equipment (S710). The acquired identification information is transmitted to the service server 100 (S715).

The service server 100 receives the identification information from the worker terminal 200 and searches for a test algorithm corresponding to the received identification information (S720). Then, the service server 100 transmits a found test algorithm to the worker terminal 200 (S725).

The worker terminal 200 executes the test algorithm received from the service server 100 (S730). The operation S730 includes an operation of loading a test log included in the test algorithm, an operation of sequentially activating all test items included in the test log in a test order, an operation of receiving test results of the activated test items, and an operation of separately storing text information and image information received as the test results.

When a problematic situation, for example, a situation requiring the manager's support, occurs while the worker tests the equipment on the basis of the test algorithm, the worker notifies the manager of the problematic situation through voice.

Meanwhile, after the operation S725, the service server 100 searches a database for 3D modeling information of the equipment corresponding to the identification information received from the worker terminal 200 (S740). Then, the service server 100 transmits the 3D modeling information that it finds to the manager terminal 300 (S745).

The manager terminal 300 receives and stores the 3D modeling information transmitted from the service server 100 (S750).

Subsequently, when the rotation icon 620 is selected from among menu icons disposed on the screen, the manager terminal 300 processes the real-world image and the 3D modeling information received from the service server 100 to generate an AR image in which a 3D virtual object corresponding to the equipment is disposed in the real-world image (S760). The operation S760 includes an operation of acquiring the real-world image including the second marker 600 through an RGB camera 311, an operation of recognizing the second marker 600 in the acquired real-world image (see (a) of FIG. 6), an operation of extracting feature points from a depth image acquired through the depth camera 312, an operation of recognizing a plane in the real-world image on the basis of the extracted feature points (see (b) of FIG. 6), and an operation of generating an AR image by placing the 3D virtual object 680 corresponding to the equipment on the recognized plane (see (c) of FIG. 6).

When the menu icon 610, 620, 630, 640, 650, or 660 is selected after the AR image, such as in (c) of FIG. 6, is displayed through the manager terminal 300, a screen corresponding to the selected menu icon is configured and displayed (S765). The operation S765 may include at least one of an operation of displaying a test log list of the currently identified equipment when the test log icon is selected, an operation of rotating the currently displayed 3D virtual object when the angular adjustment icon is selected, an operation of fixing the currently displayed 3D virtual object when the fixation icon is selected, an operation of enlarging or shrinking the currently displayed 3D virtual object when a multi-touch gesture is input, an operation of displaying a list of various digital documents related to the currently identified equipment when the file-opening icon is selected, and an operation of changing the type of 3D virtual object displayed in the AR image when the change icon is selected.

When a screen corresponding to the selected menu icon is displayed, the manager may check displayed information and determine information to be transmitted to the worker. The determined information is provided to the worker terminal 200 in the form of at least one of voice and an image (S770). The operation S770 may include an operation of capturing the currently displayed screen when the capture icon is selected and an operation of transmitting the captured screen to the worker terminal 200.

Meanwhile, the worker terminal 200 outputs the information received from the manager terminal 300 using sound or displays the information on the screen (S775).

Subsequently, when test results are input for all the test items included in the digital test log, the test algorithm ends (S780).

When the test algorithm ends, a notification message indicating the end is output in the form of sound or an image. Also, a test report is automatically generated on the basis of text information and image information input as test results in relation to each test item (S785). The generated test report may be shared with the manager terminal 300 through the service server 100 (S790).

Figure 8:
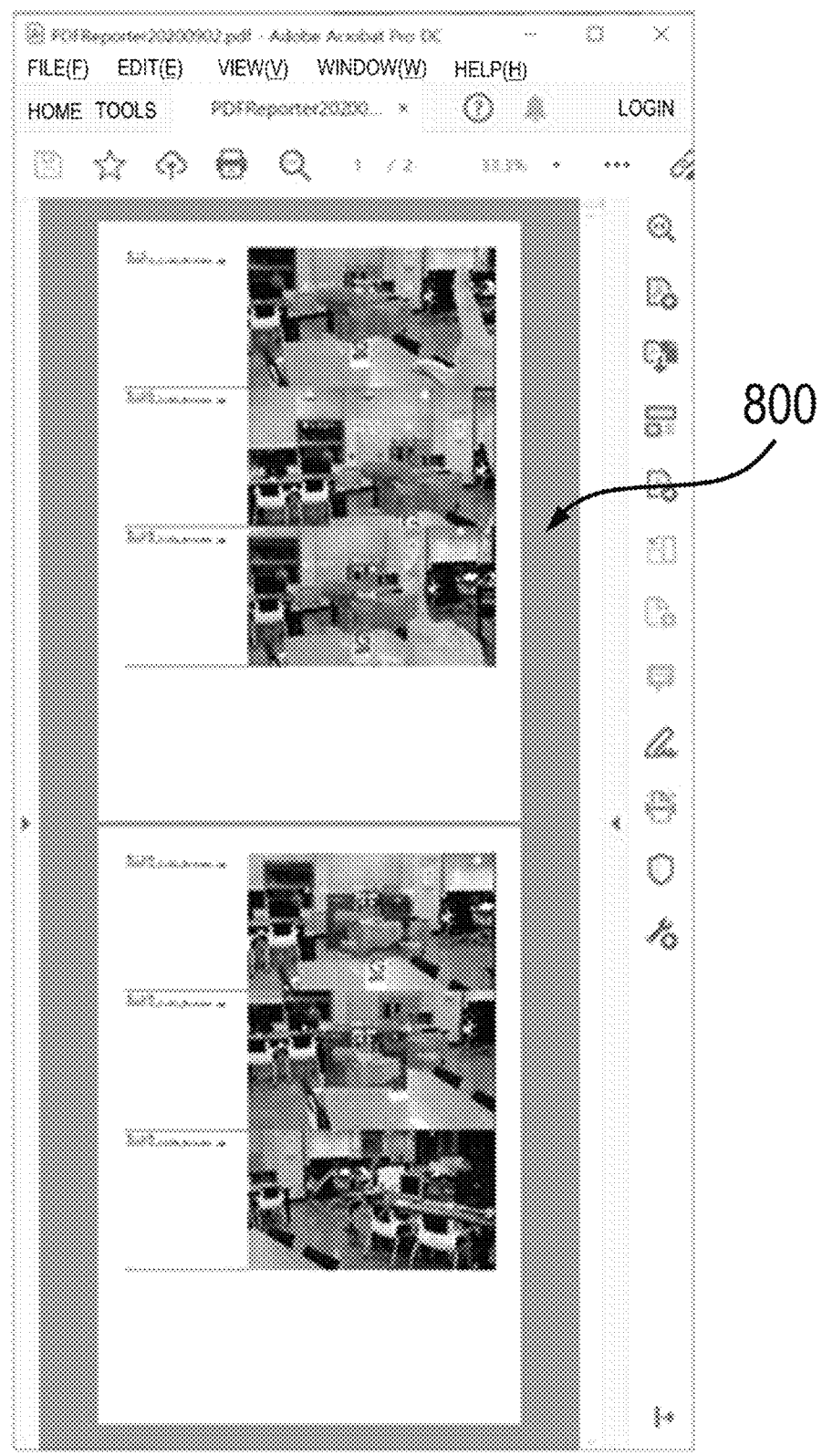
FIG. 8 is a diagram illustrating a test report that is generated when a test algorithm ends.

FIG. 8 is a diagram illustrating a test report that is automatically generated. Referring to FIG. 8, a test report 800 includes both text information and image information unlike the digital test log 400 illustrated in FIG. 2B. Also, text information and image information corresponding thereto are sequentially arranged. The test report 800 may be generated in, for example, a portable document format (PDF) file format. In addition to the PDF file format, the test report 800 may have various file formats. According to the embodiment, the manager may add his or her opinion to the test report. To this end, the manager may use a software keyboard or a voice recognition function provided by the manager terminal 300.

An XR service provision method for operating industrial equipment according to an embodiment of the present invention has been described above with reference to FIGS. 7 and 8. The order of some of the operations shown in FIG. 7 may be changed, and a subject which performs the operations may be changed.

For example, the operation S700 of making a video call between the worker terminal 200 and the manager terminal 300 may be performed between the operation S705 and the operation S780. Specifically, the video call connection operation S700 may be performed after the test algorithm execution operation S730. When the worker determines that the manager's work support is necessary while carrying out an equipment test according to the test algorithm, the worker tries to make a video call with the manager terminal 300. Then, a video call connection request signal is transmitted from the worker terminal 200 to the service server 100, and the service server 100 transmits the video call connection request signal to the manager terminal 300. The manager terminal 300 displays the video call connection request signal, and when the manager approves the video call connection, a video call is made between the worker terminal 200 and the manager terminal 300.

As another example, the operation S785 of generating the test report 800 may be performed by the service server 100 instead of the worker terminal 200. In this case, when the test algorithm ends (S780), the worker terminal 200 transmits the test results (text information and image information) received in the equipment test process to the service server 100. Then, the service server 100 automatically generates the test report 800 on the basis of the information received from the worker terminal 200. Alternatively, the service server 100 stores the information received from the worker terminal 200 and generates the test report 800 when there is a request from the worker terminal 200 or the manager terminal 300.

As still another example, the service server 100 may perform the operation S745 before making the video call between the worker terminal 200 and the manager terminal 300. While performing the operation S745, the service server 100 provides 3D modeling information of equipment provided in an industrial site with which the manager is affiliated, to the manager terminal 300 on the basis of the type of industrial site. Specifically, the service server 100 may store 3D modeling information of equipment provided in various industrial sites (e.g., the energy industry field and the aviation maintenance field). When the manager is in the energy industry field, the service server 100 provides all 3D modeling information of energy industry sites to the manager terminal 300. As another example, the service server 100 provides 3D modeling information of only equipment to which the manager's access is allowed among equipment provided in an energy industry site to the manager terminal 300. When the operation S745 is performed before the video call is made, the operation S740 is performed by the manager terminal 300 rather than the service server 100.

Thus far, embodiments of the present invention have been described. In addition to the above-described embodiments, embodiments of the present invention may be implemented through a medium including computer-readable code/instructions for controlling at least one processing element of the above-described embodiments, for example, a computer-readable medium. The medium may correspond to a medium/media that allow storage and/or transmission of the computer-readable code.

The computer-readable code may not only be recorded on media but may also be transmitted through the Internet. The media may include, for example, recording media, such as a magnetic storage medium (e.g., a read only memory (ROM), a floppy disk, a hard disk, etc.) and an optical recording medium (e.g., a compact disc (CD)-ROM, a Blu-ray disc, and a digital versatile disc (DVD)), and transmission media such as carrier waves. Since the media may be a distributed network, the computer-readable code may be stored/transmitted and executed in a distributed manner. Further, as an example, the processing element may include a processor or a computer processor and may be distributed and/or included in one device.

Although embodiments of the present invention have been described with reference to the accompanying drawings, those of ordinary skill in the art to which the present invention pertains should understand that the present invention can be implemented in other specific forms without changing the technical spirit or essential characteristics thereof. Therefore, it should be understood that the above-described embodiments are illustrative in all aspects and not restrictive.

INDUSTRIAL APPLICABILITY

The above-described extended reality (XR) service provision method and system for operating industrial equipment can be applied to industrial sites in which it is necessary to frequently carry out visual tests on various types of equipment.

The invention claimed is:

1. A method of providing an extended reality (XR) service for operating industrial equipment with which a mixed reality (MR) image or an augmented reality (AR) image is provided to a worker terminal or a manager terminal using a service server connecting a video call between the worker terminal of a worker present at an industrial site and the manager terminal of a manager present at a remote place, the method comprising:
  imaging, by the worker terminal, a first marker disposed on equipment and acquiring identification information of the equipment on the basis of the first marker;
  searching for, by the service server, a test algorithm corresponding to the identification information and transmitting the test algorithm to the worker terminal;

executing, by the worker terminal, the test algorithm to load a digital test log included in the test algorithm, sequentially activating all test items included in the digital test log in a test order to receive test results of the activated test items from the worker, and separately storing text information and image information received as the test results; and when the test algorithm ends, automatically generating a test report on the basis of the text information and the image information, wherein at least one of a location icon showing a current location of the worker in the industrial site on a map, location name information including a name of the location of the worker in the industrial site, date information, time information, a work progress icon showing test progress according to the test algorithm, an icon for loading menu icons, and a plurality of test state icons is displayed on a screen of the worker terminal.

2. The method of claim 1, wherein the digital test log includes:

a basic information input window to which basic information related to the digital test log is input; and test result input windows to which the test results are input according to all the test items and which are disposed in the test order.

3. The method of claim 2, wherein the test result input windows include a display box for displaying the test order, a display box for displaying types of superordinate attached equipment of the equipment in relation to the test items, a display box for displaying types of subordinate attached equipment of the equipment in relation to the test items, a display box for displaying test content to be tested by the worker in relation to the test items, a plurality of checkboxes for inputting state information of the test items, and an input box for inputting an additional message in relation to the state information, and the plurality of checkboxes are provided in different colors according to the state information.

4. The method of claim 3, wherein, when a test for all the test items included in the test log is completed, the plurality of checkboxes are deactivated so that the state information is not changed, a checkbox selected by the worker from among the plurality of checkboxes is kept in an existing color, and the remaining checkboxes are changed to a specific color all together.

5. The method of claim 1, wherein the test information and the image information have the same file name and are stored along the same storage path, and the file name includes at least one of a test date, identification information of the digital test log, identification information of the test items included in the digital test log, and identification information of detailed items belonging to the test items.

6. The method of claim 1, wherein at least one of the location icon, the work progress icon, the cube icon, and the plurality of test state icons is selected on the basis of a gesture command acquired as a result of recognizing a gesture of the worker or a voice command acquired as a result of recognizing voice of the worker.

7. The method of claim 1, wherein the plurality of test state icons are provided in different colors according to state information that is input as the test results of the activated test items.

8. A method of providing an extended reality (XR) service for operating industrial equipment with which a mixed reality (MR) image or an augmented reality (AR) image is provided to a worker terminal or a manager terminal using a service server connecting a video call between the worker terminal of a worker present at an industrial site and the manager terminal of a manager present at a remote place, the method comprising:

imaging, by the worker terminal, a first marker disposed on equipment and acquiring identification information of the equipment on the basis of the first marker;

searching for, by the service server, a test algorithm corresponding to the identification information and transmitting the test algorithm to the worker terminal;

searching for, by the service server, three-dimensional (3D) modeling information of equipment corresponding to the identification information and transmitting found 3D modeling information to the manager terminal;

acquiring, by the manager terminal, a real-world image including a second marker and processing the acquired real-world image and the 3D modeling information to generate an AR image in which a 3D virtual object corresponding to the equipment is disposed in a specific area of the real-world image;

when one menu icon is selected from menu icons displayed together with the AR image, configuring and displaying a screen corresponding to the selected menu icon;

when the manager checks the displayed screen and determines information to be transmitted to the worker, transmitting the determined information to the worker terminal through voice or an image;

executing, by the worker terminal, the test algorithm to load a digital test log included in the test algorithm, outputting the digital test log and the determined information, sequentially activating all test items included in the digital test log in a test order to receive test results of the activated test items from the worker, and separately storing text information and image information received as the test results; and when the test algorithm ends, automatically generating a test report on the basis of the text information and the image information.

9. The method of claim 8, wherein the configuring and displaying of the screen corresponding to the selected menu icon comprises at least one of:

when a test log icon is selected, displaying a test log list of the equipment;

when an angular adjustment icon is selected, rotating the 3D virtual object which is currently displayed;

when a fixing icon is selected, fixing a location of the currently displayed 3D virtual object;

when an enlargement command or a shrinkage command is input, enlarging or shrinking the currently displayed 3D virtual object;

when a file-opening icon is selected, displaying a list of various digital documents related to the equipment; and when a change icon is selected, changing the type of currently displayed 3D virtual object.

10. A non-transitory computer-readable recording medium storing computer-readable instructions to perform the method of claim 1 in combination with a computer which is hardware.

* * * * *